Patented Mar. 22, 1949

2,465,317

UNITED STATES PATENT OFFICE 2,465,317

VINYL ALKOXY BENZOATES

David T. Mowry and George E. Ham, Dayton, Ohio, assignors to Monsanto Chemical Company, St. Louis, Mo., a corporation of Delaware No Drawing. Application March 27, 1948,
Serial No. 17,582

4 Claims. (Cl. 260—473)

This invention relates to new chemical compounds and more particularly to vinyl esters having unusual chemical and physical properties which are more fully described hereinafter.

Polymeric vinyl acetate is a well known thermoplastic composition. It is also known that the low heat distortion point and low tensile properties of the polymeric vinyl acetate can be improved by copolymerization with vinyl benzoate. When prepared by bulk polymerization methods such copolymers, however, are not thermoplastic, and therefore are not useful in most of the applications for which polyvinyl acetate is customarily used. In copending application, Serial No. 5,481, filed January 30, 1948, by George E. Ham, there is described and claimed a method of preparing thermoplastic copolymers of vinyl acetate and vinyl benzoate by copolymerization in solution. The solution polymerization method is not generally adapted to large scale production, but the emulsion polymerization method is ineffective in preparing the copolymers.

The purpose of this invention is to provide new vinyl esters which, unlike vinyl benzoate may be copolymerized with vinyl acetate by industrially practicable emulsion polymerization methods, to form useful thermoplastic resins. A further purpose of the invention is to provide new substituted vinyl benzoates, which are useful in preparing high molecular weight products with superior mechanical properties. A still further purpose of the invention is to provide new and useful chemical compounds.

It has been found that the alkoxy substituted vinyl benzoates in which the substituent is on the benzene ring in any of the ortho- meta-, or para-positions are readily copolymerizable with vinyl acetate, whereas, vinyl benzoate copolymerizes only with difficulty and then usually forms undesirable non-thermoplastic polymers. The new compounds, useful in the practice of this invention may be represented by the following structural formula:

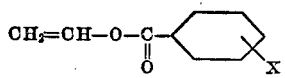

wherein X is an alkoxy radical having from one to four carbon atoms, such as methoxy, ethoxy, n-propoxy, isopropoxy and butoxy radicals.

The new vinyl esters of the alkoxy benzoic acid may be prepared from the corresponding substituted benzoic acids by ester interchange with vinyl acetate in the presence of suitable catalysts, such as the mercury salts and particularly mercurous acetate. The reaction is preferably conducted in an acid medium, for example in the presence of a small proportion of sulfuric acid. It is also desirable to conduct the reaction in the presence of a suitable polymerization inhibitor, such as hydroquinone, pyrogallol, t-butyl catechol, copper salts or any other substance known to inhibit olefinic polymerizations. Reaction mixtures containing all the necessary and desirable ingredients are heated at reflux for sufficient periods of time to effect the ester interchange. Some of the vinyl esters so produced may be separated from the reaction mass by vacuum distillation methods; others, being solids, can be purified by recrystallization.

The new compounds may also be prepared from acetylene by reaction with the substituted alkoxy benzoic acids in the presence of suitable catalysts, for example zinc and cadmium salts.

Further details of the invention are set forth with respect to the following specific example.

Example

A mixture of 594 grams of anisic acid, 684 grams of vinyl acetate, 3 grams of hydroquinone, 14 grams of mercuric acetate, and 2 cc. of concentrated sulfuric acid were refluxed on a water bath for thirty-six hours. The anisic acid slowly dissolved during the operation. The excess vinyl acetate and some of the by-product impurities were removed by vacuum distillation. The product was then distilled from the reaction mixture at 140° C. at 30 mm. pressure. The distillate, which solidified upon cooling was recrystallized from dilute ethanol solution. The solid product melted at 57 to 58° C., and was identified as vinyl p-methoxybenzoate.

The new vinyl esters of alkoxy benzoic acids are stable compounds capable of polymerization in the presence of catalysts to form valuable synthetic resins, that may be polymerized either by themselves, or conjointly with a wide variety of olefinic monomers.

In copending application, Serial No. 17,583, filed Mar. 27, 1948, by George E. Ham and David T.

Mowry, there are described and claimed copolymers of vinyl acetate and the new vinyl alkoxy benzoate herein claimed.

Although the invention has been described with respect to specific embodiments, it is not intended that the details thereof shall be construed as limitations upon the scope of the invention except to the extent incorporated in the following claims.

We claim:

1. Vinyl aromatic esters having the structural formula:

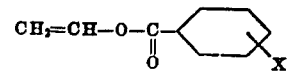

wherein X is an alkoxy radical having up to four carbon atoms.

2. Vinyl p-methoxybenzoate.
3. Vinyl o-methoxybenzoate.
4. Vinyl p-ethoxybenzoate.

DAVID T. MOWRY.
GEORGE E. HAM.

No references cited.